United States Patent [19]

Williams et al.

[11] 4,271,414
[45] Jun. 2, 1981

[54] THERMAL ARRAY PROTECTION APPARATUS

[75] Inventors: Glenn L. Williams, Bay Village; Edward J. Reilly, Mayfield Heights, both of Ohio

[73] Assignee: Gould Inc., Rolling Meadows, Ill.

[21] Appl. No.: 72,544

[22] Filed: Sep. 4, 1979

[51] Int. Cl.³ .............................................. G01D 15/10
[52] U.S. Cl. ............................... 346/76 PH; 219/216; 400/120
[58] Field of Search .................... 346/76 PH; 219/216; 400/120

[56] References Cited

U.S. PATENT DOCUMENTS

| | | | |
|---|---|---|---|
| 3,577,137 | 5/1971 | Brennan | 346/76 PH X |
| 4,070,587 | 1/1978 | Hanakata | 346/76 PH X |
| 4,216,481 | 8/1980 | Hakoyama | 346/76 PH |
| 4,219,824 | 1/1980 | Asai | 346/76 PH |

*Primary Examiner*—Joseph W. Hartary
*Attorney, Agent, or Firm*—Edward E. Sachs

[57] ABSTRACT

A thermal array protection apparatus is disclosed primarily for use in linear thermal array imaging devices. Data to be printed within a given line of data are compared to data printed within the previous lines of data. Whether data will or will not be printed in the given line of data is a function of the previous data printed. Since the apparatus prevents data from being printed for the same position in successive lines of data, the temperature of the individual thermal imaging stylii will be kept within acceptable limits.

19 Claims, 6 Drawing Figures

FIG. 4

THERMAL ARRAY PROTECTION APPARATUS

CROSS REFERENCE TO RELATED APPLICATION

This application is related to copending application U.S. Ser. No. 72,542 filed Sept. 4, 1979, in the names of Edward J. Reilly and Glenn L. Williams, the same inventors of the present invention and with the same assignee.

BACKGROUND OF THE INVENTION

The present invention relates to thermal array imaging, printing or recording devices and is more particularly directed to a protection method and apparatus to prevent overheating of the thermal array device.

It is known in the art to fabricate thermal recording devices having imaging stylii arranged in a linear array. Such devices typically are comprised of a plurality of stylii which are formed by disposing electrically resistive material on an insulating substrate to form a plurality of individual stylus in a single row. These stylii are electrically connected to driver circuits. Each stylus is selectively energized by the driver circuits to produce Joule heat. When the stylii are brought into contact with or suitable proximity with thermally sensitive imaging medium, each energized stylus makes a mark on the medium. The stylii typically are spaced to a density of 100 stylii per inch and may require as much as one watt of power to raise the stylus temperature to a level suitable for imaging. Energizing the stylii at a high repetition rate can cause overheating or even burn out of the stylii. Overheating of the stylii can also cause smudging or shadows on the recording medium.

To avoid an occurence of overheating in thermal array stylii, the prior art teaches the use of various types of temperature compensation circuits. One such circuit, disclosed in U.S. Pat. No. 3,577,137 to James Brennan, Jr., uses a temperature sensor to sense the temperature of the stylii. The power applied to the stylii then is adjusted in order to reduce the heat. Such circuits require calibration and are therefore expensive to build and maintain and are also subject to reliability problems.

Another method taught by the prior art to prevent overheating of a thermal array stylii is to control the "on" time of the incoming print command. U.S. Pat. No. 4,070,587 to Takayoshi Hanakata discloses a circuit using a "one shot" control principle, so that the drive current to the thermal stylus is cut off by the "one shot" after a predetermined interval. Such circuits, however, will not protect against overheating of the thermal stylii caused by rapid repetition of the stylus drive current.

Still another way to prevent overheating is accomplished in the prior art by the use of large metal heat-sinks and by air cooling. Such devices add weight to the device and are not very efficient.

OBJECTS OF THE INVENTION

An object of the invention is to provide a protection apparatus for thermal arrays which reduces the severity of heating problems known in the prior art of thermal imaging devices.

Another object of the invention is to provide such a protection apparatus which will greatly improve the efficiency of stylii temperature reduction.

Still another object of the invention is to provide a protection apparatus which enables a thermal imaging array to operate at higher data rates than was heretofore achievable.

The above objects are given by way of example. Thus, other desirable objectives and advantages achieved by the invention may occur to those skilled in the art. The scope of the invention is to be limited only by the appended claims.

BRIEF SUMMARY OF THE INVENTION

The above objects and other advantages are achieved by the present invention. An apparatus is provided for use in thermal array imaging, printing or recording devices to prevent heat build up and thermal burn out of the stylii. An incoming digital line of data comprised of individual datum positions is received. The line of data is passed by a first passing means to a second passing means and is simultaneously stored in a first storing means. The second passing means passes the line of data to a drive circuit which in turn current drives the thermal array stylii. A next line of data is received and is compared to the previous line of data in the first storing means to determine if data exist in corresponding positions. The data of the next line of data are blocked from passing through the first passing means for those positions. All other data are passed. A first storing means stores the data passed in the next line of data. A second storing means stores data for those corresponding positions between the two lines of data. The next line of data is then passed to the drive circuit by the second passing means. Another line of data is received and is compared to the line of data just passed to determine again if data exist in corresponding positions. Only the data that does not have data in a corresponding position will be passed to the second passing means by the first passing means. The second passing means will pass only that data in positions for which the second storing means has stored data in corresponding positions or for positions which is a coincidence function of one-fourth the word length frequency and one-half the datum position frequency. The sequence is then repeated for each subsequent line of data received.

BRIEF DESCRIPTION OF THE DRAWINGS

FIG. 4 is a print out representation for illustrating the operation of the embodiment shown in FIG. 2;

FIG. 6 is a dot pattern representation for illustrating the overlap phenomena that occur in thermal printers.

DESCRIPTION OF THE PREFERRED EMBODIMENTS

Figure 1:
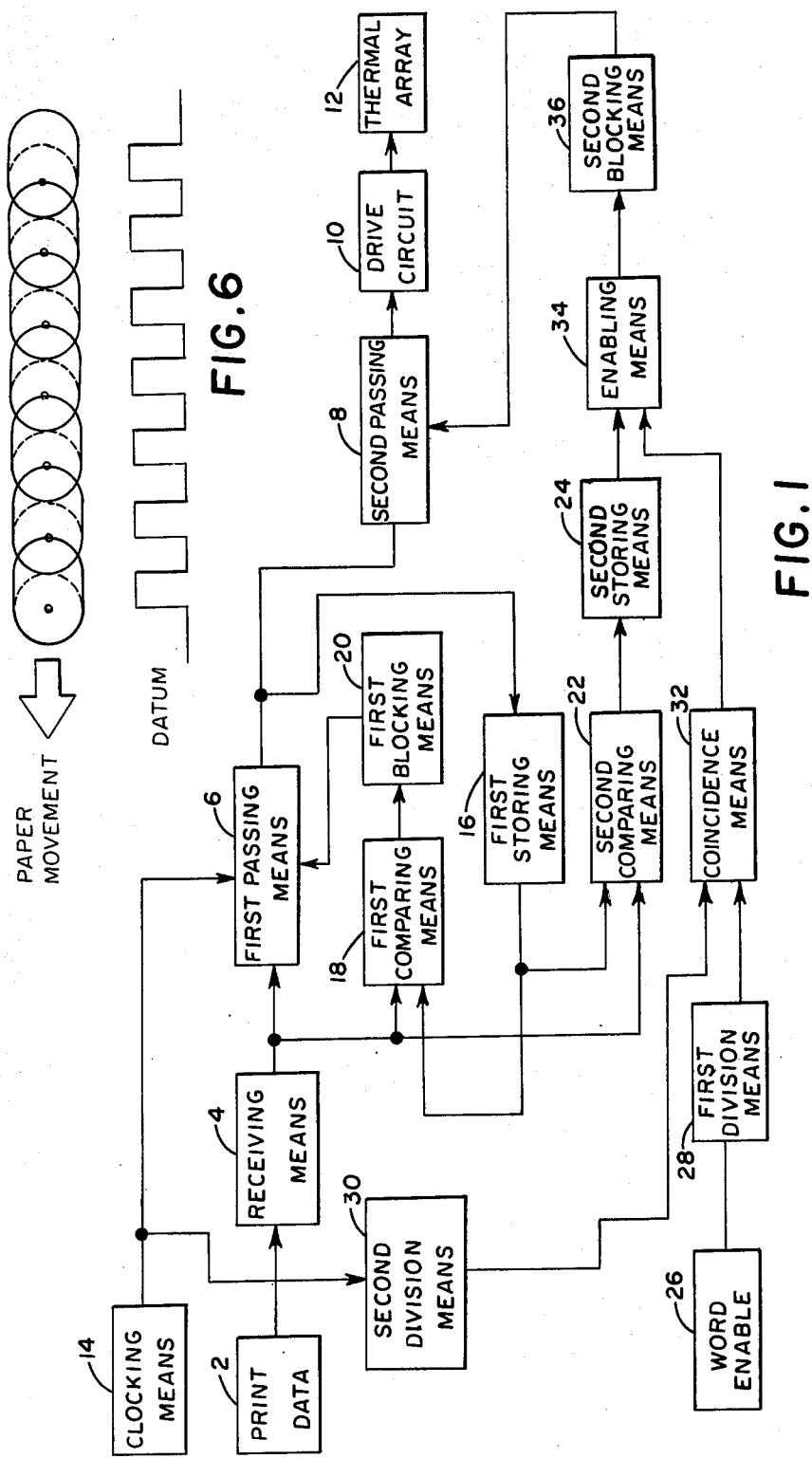
FIG. 1 is a block diagram showing a generalized embodiment of the present invention.

A description of the invention follows, referring to the drawings in which like reference numerals denote like elements of structure in each of the several Figures.

In this application, the word "HIGH" is used, as is known in the art, to represent a digital voltage level. A digital HIGH in this application will also be designated by the numeral "1" and will be referred to as a "logic state 1". The word "LOW" is used, as is known in the art, to represent a different, lower digital voltage level.

A digital LOW in this application will also be designated by the nuneral "0" and will be referred to as a "logic state 0". The voltage levels that define a digital HIGH or a digital LOW will depend on the type of digital devices used. For example, if Transistor-Transistor Logic (TTL) is used, a digital LOW will typically be from 0.0 to 0.8 volts d.c. and a digital HIGH will be from 2.0 to 5.5 volts d.c.

FIG. 1 is a block diagram showing a generic embodiment of the apparatus according to the present invention. Print data is generated by a suitable source 2 and is transmitted to a receiving means 4. The print data coming from source 2 is a series of digital lines of data which may be representative of an analog waveform. Each line of data comprises individual datum points located in individual datum positions. The number of datum positions in each line corresponds to the number of stylii in the thermal array. For example, if the thermal array has 512 stylii, there will be 512 datum positions in each line of data received. If a digital HIGH or a 1 is present in a particular datum position, this will be interpreted as data existing in the position. The line of data received is passed by a first passing means 6 to a second passing means 8. The second passing means 8 then passes the line of data received to a current drive circuit 10. The current drive circuit 10 powers the individual stylus within the thermal array 12. For example, if data exist in datum positions 21 through 50 and 176 through 200 and is passed by first passing means 6 and second passing means 8, the drive circuit 10 will power the stylii 21 through 50 and 176 through 200 in thermal array 12. A clocking means 14 is operatively connected to the passing means 6 in order to synchronize and position the line of data passing to the individual stylus to be driven. If there are 512 stylii in thermal array 12, there will be 512 clock pulses from clocking means 14 per line of data received; each clock pulse corresponding to a separate stylus to be driven.

The line of data passed by passing means 6 is also stored in first storing means 16. A next line of data is then received by receiving means 4. Each datum position in this next line of data received is compared to the corresponding datum positions in the passed line of data stored in first storing means 16. This comparison is done in first comparing means 18. If the comparing means 18 determines that data exist in corresponding datum positions, a first blocking means 20 is provided to block the passing through the first passing means 6 of data for those positions containing corresponding data in this next line of data. In the prior example, the first line of data had data in positions 21 through 50 and 176 through 200. If the next line of data has data in positions 16 through 25 and 190 through 250, the first blocking means 20 will prevent the passing of data for positions 21 through 25 and 190 through 200. The first storing means 16 will then be updated to store the datum for positions 16 through 20 and 201 through 250. This will be the data passed to second passing means 8. The effect of first storing means 16 is to delay the line of data passed by first passing means 6 by one line of data, i.e., 512 clock pulses.

A second comparing means 22 is provided which is operatively connected to both the receiving means 4 and first storing means 16. Second comparing means 22 compares the corresponding datum positions between the line of data in first storing means 16 and the next line of data received by receiving means 4. The second comparing means 22 will generate a digital signal, typically a digital HIGH when data is detected in corresponding datum positions. This signal generated by second comparing means 22 is stored in second storing means 24.

A word enable means 26 is provided that preferably generates a digital HIGH signal for a duration equal to a line of data received. For example, if a line of data is 512 clock pulses long, the word enable means 26 would preferably generate a digital HIGH signal for a time equivalent to 512 clock pulses.

A first division means 28 is operatively connected to word enable means 26 to divide the frequency of the word enable output by four. A second division means 30 is operatively connected to the clocking means 14 to divide the clocking frequency by two. A coincidence means 32 is operatively connected to both the first division means 28 and the second division means 30 to produce an EXCLUSIVE-OR output signal of the two divided frequencies. An enabling means 34 is operatively connected to coincidence means 32 and second storing means 24 to provide an enabling signal when the coincidence means 32 produces a signal or when the second storing means 24 has datum in the line of data position presently being clocked by the clocking means 14. Second blocking means 36 is operatively connected to enabling means 34 and to second passing means 8 to block the passing of datum from first passing means 6 to the current drive circuit 10 for those positions which the enabling means 34 produced a signal. The result of this invention is to reduce the effective power output and thus reduce the heat generated by the thermal array by as much as 75%. As will be discussed infra, this has no adverse effect on the resultant print out on the thermal sensitive media caused by using this apparatus.

Figure 2:
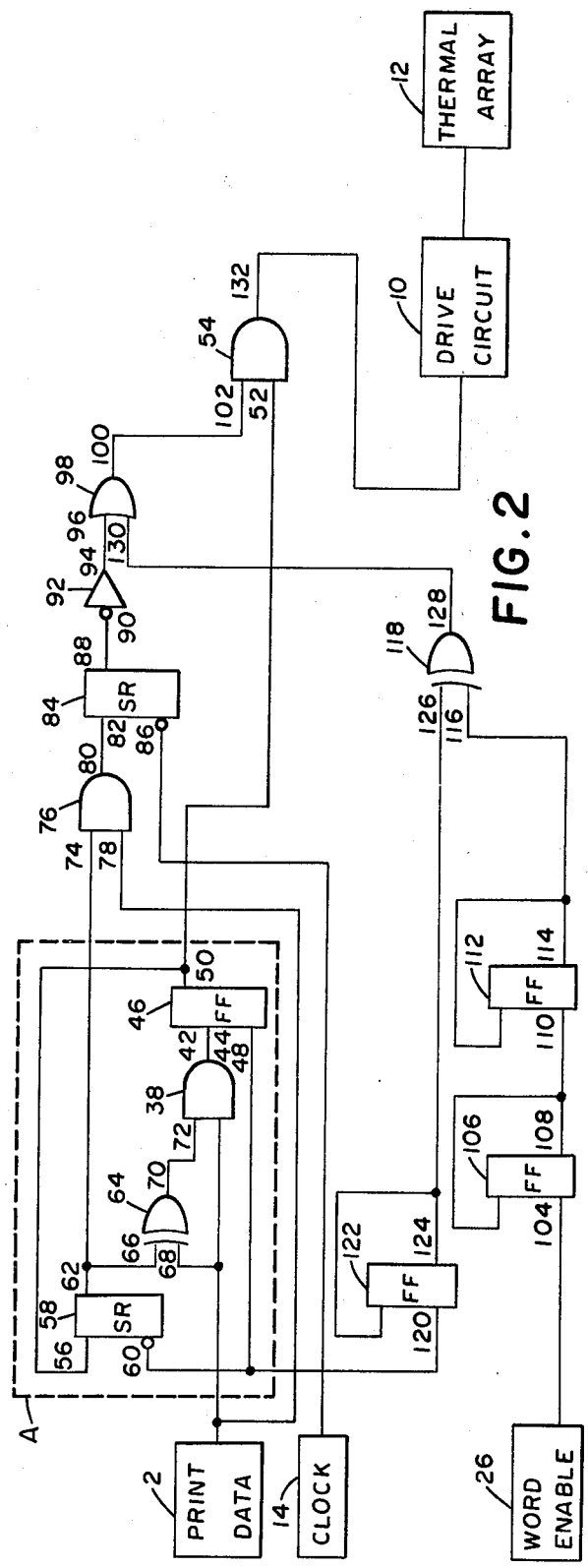
FIG. 2 is a circuit diagram showing an embodiment of the present invention.
Figure 3:
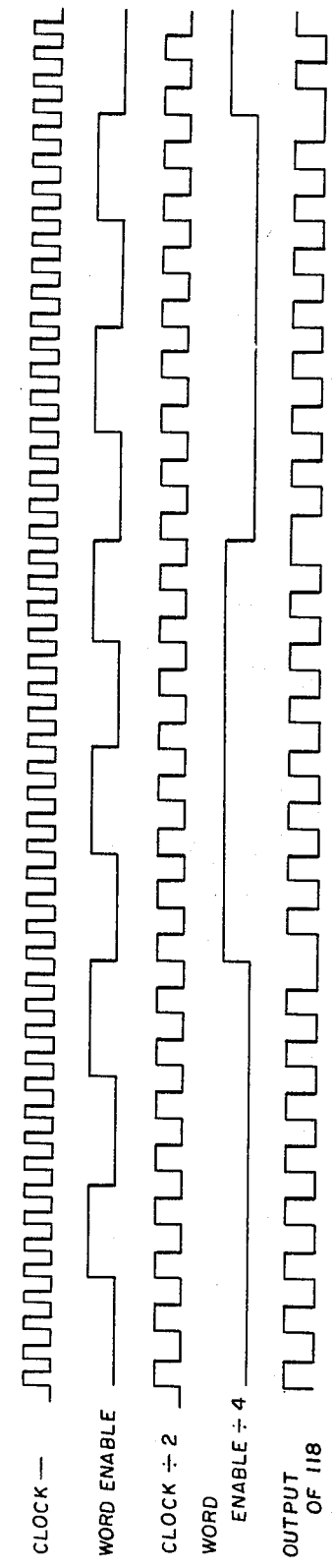
FIG. 3 is a signal waveform representation for illustrating the operation of the embodiment shown in FIG. 2.

FIG. 2 illustrates a specific embodiment of the invention. The general mode of operation of this circuit is the same as that of the generic embodiment shown in FIG. 1. The print data from source 2 is a series of lines of data comprising individual datum positions as described above. The line of data is received by AND gate 38 through one of its inputs 40. The line of data passes from the output 42 of AND gate 38 to the input 44 of FLIP-FLOP 46. Clock means 14 is connected to the clock input 48 of FLIP-FLOP 46. The FLIP-FLOP 46 positions and synchronizes the line of data received to the stylii to be driven. The output 50, of FLIP-FLOP 46 is connected to one of the inputs 52 of AND gate 54 and is also connected to input 56 of shift register 58. Clocking means 14 is also connected to the clock input 60 of shift register 58. The shift register 58 is of a type selected to correspond to the number of datum positions within a line of data. As in the previous examples, if a line of data has 512 datum positions, shift register 58 will have 512 positions. The effect of shift register 58, as will be apparent to those skilled in the art, is to delay the line of data passed by one line of data. Thus, the first datum position passed by the output 62 of shift register 58 will be synchronized with and correspond to the first datum positions of the next line of data received. An EXCLUSIVE-OR gate 64 is provided as a comparing means. The output 62 of shift register 58 is connected to the input 66 of EXCLUSIVE-OR gate 64. The incoming print data from source 2 is connected to the other input 68 of EXCLUSIVE-OR gate 64. This means that the 68 of EXCLUSIVE-OR gate 64 is connected to the input 40 of AND gate 38. The output 70 of EXCLUSIVE-OR gate 64 is connected to the other input 72 of AND gate 38. It will be apparent to those skilled in the art that AND gate 38 acts as a first blocking means to allow incoming data to be passed only when data exist in a datum position of the new line of data received and there was no data in the corresponding datum positions of the previously passed line of data. AND gate 38 in combination with FLIP-FLOP 46 acts as the first blocking means and the first passing means. AND gate 38 also acts as the receiving means. Output 62 of shift register 58 is connected to input 74 of AND gate 76. The other input 78 of AND gate 76 is connected to the print data source 2. Output 80 of AND gate 76 is connected to input 82 of shift register 84. Clocking means 14 is connected to clock input 86 of shift register 84. AND gate 76 acts as a second comparing means to compare the data being clocked out of shift register 58 to the next line of data received from print data source 2. AND gate 76 will produce the digital HIGH out of output 80 whenever data is detected in corresponding positions for the next line of data received and the line of data stored in shift register 58. Shift register 84 acts as a second storing means to store the signals produced by AND gate 76. Output 88 of shift register 84 is connected to the input 90 of INVERTER 92. The output 94 of INVERTER 92 is connected to the input 96 of OR gate 98. The output 100 of OR gate 98 is connected to input 102 of AND gate 54.

Word enable means 26 is connected to the input 104 of FLIP-FLOP 106. The output 108 of FLIP-FLOP 106 is connected to the input 110 of FLIP-FLOP 112. The output 114 of FLIP-FLOP 112 is connected to input 116 of EXCLUSIVE-OR gate 118.

The circuit in FIG. 2 is not limited to construction with discrete or individual components. This protection circuit can be formed into a hybrid integrated circuit which may in turn lead to a reduction in the number of components.

An individual stylus can use one watt of power to generate a sufficient amount of Joule heat to make a mark on thermal sensitive paper. If there are 512 stylii in an array and a line of incoming data has data in all 512 positions, the stylii would use 512 watts of power. If every successive line also contains data in all positions, this invention would yield an effective reduced power output of 75%.

Figure 4:
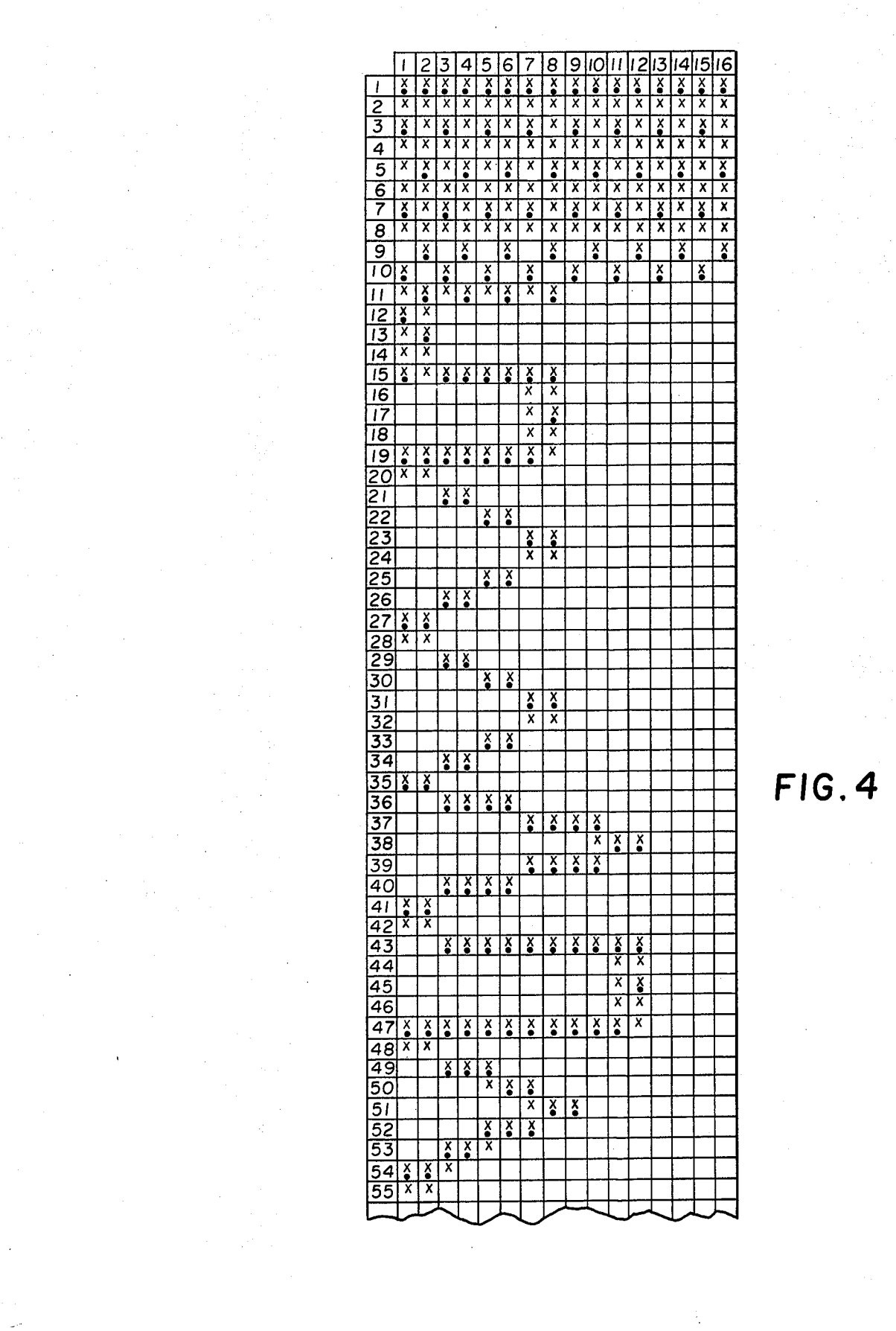

FIG. 4 shows a print out pattern generated by the present invention for a thermal array containing 16 stylii. An "x" represents data received within a line of data and the "." represents the mark that would be made on the thermal sensitive paper by the stylii using the present invention. FIG. 4 is only a diagrammatic representation of what the typical print out would look like in actual practice of this invention. A typical thermal linear array may contain 512 stylii with a spacing of 100 stylii per inch. New lines of data can typically be received at a rate of 200 lines per second. An individual energized stylus will make a mark on a thermal sensitive paper approximately 0.25 mm in diameter, assuming a stylus of approximately the same size. A maximum paper speed in a thermal recording device in the orthogonal direction from the linear array can typically be 50 mm/sec. FIG. 6 shows a dot pattern produced by one stylus pulsed at a rate of 200 HZ with the paper moving at 50 mm/sec. It can be seen that there is an overlapping of data for successive positions. At even moderate paper speed rates, there can be an overlapping of data by as much as eightfold or more, i.e., there can be as many as eight or more pieces of data printed at least partially on top of each other. Thus, it will be apparent to those skilled in the art that there will be no loss of resolution and no appreciable effect in the print out by use of the present invention. But, it will also be apparent that there will be an effective reduction in the heat produced by the thermal array by as much as 75%.

Figure 5:
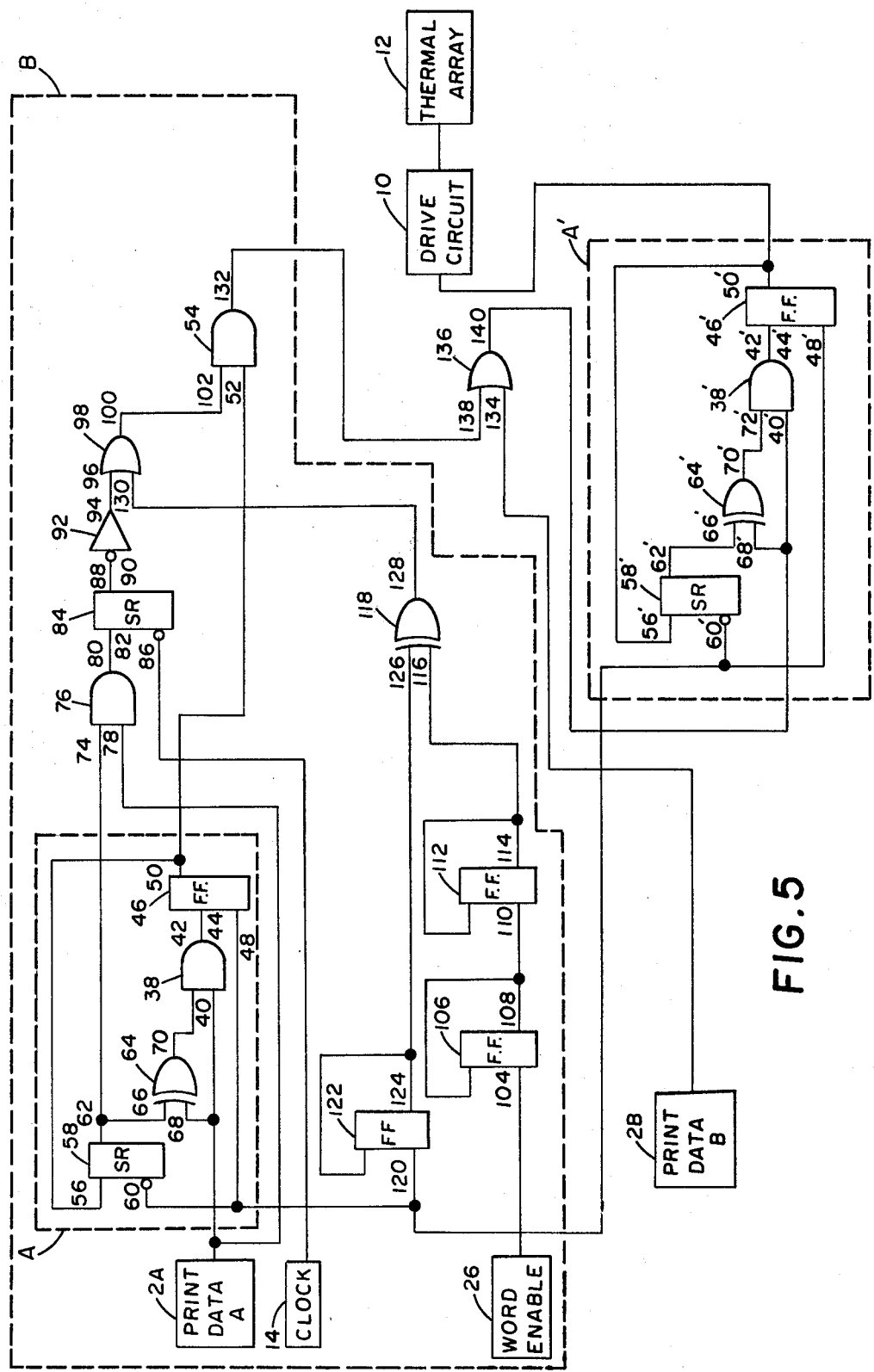
FIG. 5 is a circuit diagram showing another embodiment of the present invention.

FIG. 5 illustrates another embodiment of this invention. The embodiment illustrated in FIG. 2 is more particularly useful for displaying graphical data. Since character generation requires a higher degree of resolution, a modification has been made to the FIG. 2 embodiment. Referring now to FIG. 5, the portion of the circuit designated B is essentially the same circuit as shown and described with reference to FIG. 2. Print data A generated by an appropriate source 2A is graphic data, i.e., sine waves, square waves, etc. Print data B generated by an appropriate source 2B is character data. The portion of the circuit designated A' operates identically as described above for the portion of the circuit designated A. Output 132 of AND gate 54 is connected to input 138 of OR gate 136. Print data B from an appropriate source 2B is connected to input 134 of OR gate 136. Output 140 of OR gate 136 is connected to the input of the circuit A'. The output of circuit A' is connected to current drive circuit 10 which is connected to thermal array 12. Clock 14 is also connected to circuit A' but because of inherent timing delays in digital circuitry, may be required to pass through a delay means or skewing means, not shown, prior to the connection with circuit A'. The result of this modification is to allow graphic data to be printed out in the manner described above and to allow character data to be printed out for all datum positions that were not printed in the prior line of data. This gives the needed higher resolution for character data. The effective power reductions are 75% for graphic data and 50% for character data printed. For a more detailed explanation of the operation of the circuit portion designated A' used in character generation, see co-pending application Serial No. 72,542 filed by the same Applicants concurrently herewith, and assigned to the same assignee, which is incorporated herein by reference.

The use of the protection method or the protection circuit is not limited to linear thermal array devices but can be used in any display device that receives successive lines of data wherein the lines of data comprise a plurality of individual datum separated into a number of datum positions.

This invention has been described with reference to preferred embodiments. Obvious modifications and alterations will occur to others upon reading and understanding of this specification. The intention is to include all such modifications and alterations insofar as they come within the scope of the appended claims or the equivalent thereof.

What is claimed is:

1. A thermal array protection apparatus for use in thermal imaging apparatuses of the type in which a linear array of heat-generating resistive elements is used to place marks on thermal sensitive recording media during imaging operations, said apparatus comprising:

receiving means to receive an incoming digital line of data comprising a plurality of individual datum positions;

first passing means operatively connnected to said receiving means to pass the digital line of data received;

clocking means operatively connected to said first passing means to position and synchronize the individual data within said digital line of data received to the individual stylus to be driven;

first storing means operatively connected to said first passing means and said clocking means to store the data passed through said first passing means;

first comparing means operatively connected to said receiving means and said first storing means to compare the datum positions of the stored data in said first storing means to the datum positions of the next line of data received by said receiving means and determine when data exists in corresponding positions;

first blocking means operatively connected to said first comparing means to block the passing by said first passing means of the individual data from said next line of data received for those positions which said first comparing means determined the existence of said corresponding data;

second passing means operatively connected to said first passing means to pass the digital line of data passed by said first passing means to a driving means for current driving the thermal array stylii;

second comparing means operatively connected to said first storing means and said receiving means to compare the datum position in said first storing means to the datum positions of another line of data received by said receiving means and determine when data exist in corresponding positions;

second storing means operatively connected to said second comparing means and said clocking means to store data for those positions which said second comparing means determined the existence of corresponding data;

word enable means to generate digital HIGH signal of a duration corresponding to the length of a digital line of data received;

first division means operatively connected to said word enable means to divide the word enable means frequency by four;

second division means operatively connected to said clocking means to divide the clock frequency by two;

coincidence means operatively connected to both first and second division means to produce an EXCLUSIVE-OR signal of the two divided frequencies;

enabling means operatively connected to said second storing means and said coincidence means to provide an enabling signal when the coincidence signal produces a signal or when the second storing means has data in the position presently being clocked by said clocking means; and second blocking means operatively connected to said enabling means and said second passing means to block the passing by said second passing means of the individual data from the following lines of data received for those positions which said enabling means produces a signal.

2. The thermal array protection apparatus of claim 1 wherein said first and said second storing means are updated each time a new line of data is received by said receiving means.

3. The thermal array protection apparatus of claim 1 wherein said first and second storing means are shift registers.

4. The thermal array protection apparatus of claim 1 wherein said first comparing means is an EXCLUSIVE-OR gate.

5. The thermal array protection apparatus of claim 1 wherein said first and said second blocking means is an AND gate.

6. The thermal array protection apparatus of claim 1 wherein said first division means is two FLIP-FLOPs in series.

7. The thermal array protection apparatus of claim 1 wherein said second division means is a single FLIP-FLOP.

8. The thermal array protection apparatus of claim 1 wherein said coincidence means is an EXCLUSIVE-OR gate.

9. The thermal array protection apparatus of claim 1 wherein said enabling means is an OR gate.

10. A thermal array protection apparatus of claim 1 wherein said second comparing means is an AND gate.

11. A thermal array protection apparatus for use in thermal imaging apparatuses of the type in which a linear array of heat-generating resistive elements is used to place marks on thermal sensitive recording media during imaging operations, said apparatus comprising:

first receiving means to receive an incoming digital line of graphic data, said line of graphic data comprising a plurality of individual datum;

first passing means operatively connected to said first receiving means to pass the digital line of graphic data received;

clocking means operatively connected to said first passing means to position and synchronize the individual datum within said digital line of graphic data received to the individual stylus to be driven;

first storing means operatively connected to said first passing means and said clocking means to store the data passed through said first passing means;

first comparing means operatively connected to said first receiving means and said first storing means to compare the datum positions of the stored data in said first storing means to the datum positions of the next line of graphic data received by said first receiving means and determine when data exist in corresponding positions;

first blocking means operatively connected to said first comparing means to block the passing by said first passing means of the individual data from said next line of graphic data received for those positions which said first comparing means determined the existence of said corresponding data;

second passing means operatively connected to said first passing means to pass the digital line of graphic data passed by said first passing means to a driving means for current driving the thermal array stylii;

second comparing means operatively connected to said first storing means and said first receiving means to compare the datum position in said first storing means to the datum positions of another line of graphic data received by said first receiving means and determine when data exist in corresponding positions;

second storing means operatively connected to said second comparing means and said clocking means to store data for those positions which said second comparing means determined the existence of corresponding data;

word enable means to generate a digital signal of a duration corresponding to the length of a digital line of graphic data received;

first division means operatively connected to said word enable means to divide the word enable means frequency by four;

second division means operatively connected to said clocking means to divide the clock frequency by two;

coincidence means operatively connected to both first and second division means to produce an EXCLUSIVE-OR signal of the two divided frequencies;

enabling means operatively connected to said second storing means and said coincidence means to provide an enabling signal when the coincidence signal produces a signal or when the second storing means has data in the position presently being clocked by said clocking means;

second blocking means operatively connected to said enabling means and said second passing means to block the passing by said second passing means of the individual data from the following lines of graphic data received for those positions which said enabling means produces a signal;

second receiving means to receive an incoming digital line of character data, said line of character data comprising a plurality of individual data;

third passing means operatively connected to said second receiving means to pass the digital line of character data received to said driving means for current driving the thermal array stylii wherein said clocking means is operatively connected to said third passing means to position and synchronize the individual data within said line of character data received in the individual stylus to be driven;

third storing means operatively connected to said third passing means and said clocking means to store the data passed through said third passing means;

third comparing means operatively connected to said second receiving means and said third storing means to compare datum positions of the stored data in said third storing means to the datum positions of the next line of character data received by said second receiving means and determine when data exist in corresponding positions; and third blocking means operatively connected to said third comparing means to block the passing by said third passing means of the individual data from said next line of character data received for those positions which said third comparing means determined the existence of said corresponding data.

12. The thermal array protection apparatus of claim 11 wherein said first and second storing means are updated each time a new line of graphic data is received by said first receiving means and said third storing means is updated each time a new line of character data is received by said second receiving means.

13. The thermal array protection apparatus of claim 11 wherein said first, said second and said third storing means are shift registers.

14. The thermal array protection apparatus of claim 11 wherein said first comparing means and said third comparing means are EXCLUSIVE-OR gates.

15. The thermal array protection apparatus of claim 11 wherein said first, said second and said third blocking means are AND gates.

16. The thermal array protection apparatus of claim 11 wherein said first division means are two FLIP-FLOPs in series.

17. The thermal array protection apparatus of claim 11 wherein said second division means is a single FLIP-FLOP.

18. The thermal array protection apparatus of claim 11 wherein said coincidence means is an EXCLUSIVE-OR gate.

19. The thermal array protection apparatus of claim 11 wherein said enabling means is an OR gate.

* * * * *